US009478970B2

(12) United States Patent
Chen et al.

(10) Patent No.: US 9,478,970 B2
(45) Date of Patent: Oct. 25, 2016

(54) METHOD AND APPARATUS FOR PROVIDING A POWER FACTOR CORRECTION (PFC) COMPATIBLE SOLUTION FOR ELECTRONIC DEVICES

(71) Applicant: Schneider Electric IT Corporation, North Billerica, MA (US)

(72) Inventors: Hsiu-Ping Chen, Taipei (TW); Sheng-Hsien Fang, New Taipei (TW); Shih-Hsiung Feng, Shindian (TW); Chen-Jui Shen, Jhonghe (TW)

(73) Assignee: Schneider Electric IT Corporation, Boston, MA (US)

( * ) Notice: Subject to any disclaimer, the term of this patent is extended or adjusted under 35 U.S.C. 154(b) by 780 days.

(21) Appl. No.: 13/848,515

(22) Filed: Mar. 21, 2013

(65) Prior Publication Data
US 2013/0297088 A1 Nov. 7, 2013

Related U.S. Application Data

(63) Continuation of application No. 12/512,709, filed on Jul. 30, 2009, now Pat. No. 8,405,372.

(60) Provisional application No. 61/201,502, filed on Dec. 10, 2008.

(51) Int. Cl.
*H02M 1/42* (2007.01)
*H02H 3/40* (2006.01)
*H02M 7/5387* (2007.01)

(52) U.S. Cl.
CPC ........... *H02H 3/40* (2013.01); *H02M 7/53873* (2013.01); *H02M 1/42* (2013.01); *Y10T 307/615* (2015.04)

(58) Field of Classification Search
CPC ......... H02M 7/5387; H02M 7/53871; H02M 7/53873; H02M 1/42; H02H 3/40
See application file for complete search history.

(56) References Cited

U.S. PATENT DOCUMENTS 5,099,410 A   3/1992  Divan
5,479,090 A * 12/1995  Schultz ................. H02M 3/156
                                                  323/284

(Continued)

FOREIGN PATENT DOCUMENTS

GB          2 288 891 A     11/1995
WO    WO 2010/068456 A1     6/2010

OTHER PUBLICATIONS

Notification of Transmittal of the International Search Report and the Written Opinion of the International Searching Authority, or the Declaration from International Application No. PCT/US2009/066522, "Power Factor Correction (PFC) for Nonsinusoidal Uninterruptible Power Supply", Date of Mailing: Feb. 4, 2010.

(Continued)

*Primary Examiner* — Jessica Han
(74) *Attorney, Agent, or Firm* — Hamilton, Brook, Smith & Reynolds, P.C.

(57) ABSTRACT

Methods and apparatuses for providing a solution for incompatibility between nonsinusoidal waveform uninterruptible power supply (UPS) systems and active power factor correction (PFC) loads are disclosed. An embodiment of the invention includes generating a nonsinusoidal signal waveform (e.g., a voltage waveform), to be delivered to the load, with a pulse width modulation (PWM) duty width, sampling the nonsinusoidal signal waveform to collect output signal samples, and adjusting the duty width to control the nonsinusoidal signal waveform as a function of the output signal samples to deliver a desired signal characteristic (e.g., RMS signal level) to the load. In embodiments of the invention, the output duty width is adjusted differently in cases of rising and falling power consumption, respectively, by the load. Techniques disclosed herein find broad applicability in electronic devices, such as servers, computers, UPS systems and inverters and improve efficiency and reliability for end users and utility providers.

34 Claims, 14 Drawing Sheets

(56) References Cited

U.S. PATENT DOCUMENTS

| | | |
|---|---|---|
| 5,614,813 A | 3/1997 | Batson |
| 5,637,975 A * | 6/1997 | Pummer ............. H02P 23/0081 318/729 |
| 5,687,735 A | 11/1997 | Forbes et al. |
| 5,790,391 A | 8/1998 | Stich et al. |
| 6,031,749 A | 2/2000 | Covington et al. |
| 6,252,373 B1 | 6/2001 | Stefansson et al. |
| 6,700,356 B1 | 3/2004 | Dorn |
| 7,202,640 B2 * | 4/2007 | Morita ................ H02M 1/4225 323/205 |
| 7,358,706 B2 | 4/2008 | Lys |
| 7,863,875 B1 * | 1/2011 | Guo .................... H02M 3/1584 323/275 |
| 8,116,105 B2 | 2/2012 | Klikic et al. |
| 8,405,372 B2 | 3/2013 | Chen et al. |

OTHER PUBLICATIONS

International Preliminary Report on Patentability and the Written Opinion of the International Searching Authority from International Application No. PCT/US2009/066522, "Power Factor Correction (PFC) for Nonsinusoidal Uninterruptible Power Supply", date of mailing: Jun. 23, 2011.

Non-Final Office Action for U.S. Appl. No. 12/512,709, "Method and Apparatus for Providing a Power Factor Correction (PFC) Compatible Solution for Nonsinusoidal Uninterruptible Power Supply (UPS)", dated May 23, 2012.

Notice of Allowance and Fees due for U.S. Appl. No. 12/512,709, "Method and Apparatus for Providing a Power Factor Correction (PFC) Compatible Solution for Nonsinusoidal Uninterruptible Power Supply (UPS)", dated Dec. 6, 2012.

* cited by examiner

METHOD AND APPARATUS FOR PROVIDING A POWER FACTOR CORRECTION (PFC) COMPATIBLE SOLUTION FOR ELECTRONIC DEVICES

RELATED APPLICATIONS

This application is a Continuation of U.S. application Ser. No. 12/512,709 filed Jul. 30, 2009, claims the benefit of U.S. Provisional Application No. 61/201,502, filed on Dec. 10, 2008. The entire teachings of the above applications are incorporated herein by reference.

BACKGROUND OF THE INVENTION

Energy transmission via electric power systems is critical to modern civilization. Since numerous electric devices draw alternating current (AC) power from utility sources (i.e., line power from the electric power grid), power failures (i.e., outages or interruptions) can be a serious concern. The use of uninterruptible power supplies (UPSs) having battery back-up systems to provide regulated, uninterrupted power for sensitive and/or critical loads, such as computer systems, and other data processing systems is well known.

Uninterruptible power supply (UPS) systems are commonly used in conjunction with a variety of electric devices to safeguard against power failures. UPS systems are available in various configurations to provide varying functionality, but they all typically provide power in the event of a power interruption.

A UPS system may be connected to line power so that a device connected to the UPS system (referred to as the load) may use line power during normal conditions. UPS systems typically include a battery to store energy, a rectifier to convert AC to direct current (DC) for passing through the battery, and an inverter to convert DC battery power back to AC when backup power is generated.

Ideally, the voltage waveform corresponding to the UPS output voltage (i.e., the electrical signal representing the voltage delivered to the load) is sinusoidal, since electric devices draw AC power that is sinusoidal. Nonsinusoidal waveforms (e.g., square waveforms) typically have greater occurrence of transient oscillations due to sharp voltage changes. However, certain nonsinusoidal waveforms, such as square waves, are easier to generate (and hence less expensive) than sinusoidal waveforms and are therefore commonly used in UPS systems.

SUMMARY OF THE INVENTION

An embodiment of the invention is a method, or corresponding apparatus, of controlling an output signal to be delivered to a load. A nonsinusoidal signal waveform that is to be delivered to the load is generated with a pulse width modulation (PWM) duty width. The nonsinusoidal signal waveform is sampled to collect output signal samples. A determination is made based on the output signal samples as to whether the load is demanding more or less power over time. The duty width is adjusted to control the nonsinusoidal signal waveform as a function of the output signal samples. In this way, a desired signal characteristic is delivered to the load.

In an embodiment, the output signal, nonsinusoidal signal waveform, and output signal samples correspond to voltages.

The desired signal characteristic may be a desired root mean square (RMS) signal level.

In a case of falling output signal samples, adjusting the duty width may include increasing the duty width. In a case of rising output voltage samples, adjusting the duty width may include decreasing the duty width, for example, to match the RMS signal level of output voltage samples to a desired RMS signal level.

In one embodiment, the nonsinusoidal signal waveform is a square signal waveform. The nonsinusoidal signal waveform may have a zero value for a nonzero time duration between each half-cycle of the nonsinusoidal signal waveform.

The method may also include controlling an electromagnetic field in a transformer according to the PWM and controlling power switches configured to control power delivery to the load according to the PWM.

The method may also include delivering the nonsinusoidal signal waveform to a load including an active power factor correction (PFC) controller.

An embodiment includes executing software to control the nonsinusoidal signal waveform.

Embodiments may be employed in an inverter or an uninterruptible power supply (UPS).

In one embodiment, sampling includes sampling the nonsinusoidal signal waveform on a cycle-to-cycle basis, and determining whether consecutive cycles indicate that the load is demanding more power over time is based on consecutive cycles. In that case, the duty width is increased to compensate for the load's demanding more power.

The output signal sample from a given cycle may be obtained at a point offset from the start of the given cycle by about one-eighth of the period of the given cycle, less than one-half of the period of the given cycle, or less than one-quarter of the period of the given cycle.

Determining whether consecutive cycles indicate that the load is demanding more power over time may include comparing a change in samples representing the nonsinusoidal signal waveform from cycle-to-cycle against a threshold, e.g., 10 volts.

In an embodiment, generating the nonsinusoidal signal waveform includes calculating the duty width. Increasing the duty width may include re-calculating the duty width to determine a re-calculated duty width, based on the output signal samples and further based on averaging the output signal samples from a given cycle and one or more cycles preceding the given cycle, if the load is less than a threshold. If the load is not less than the threshold, the output signal sample from the given sample may be used. Calculating the duty width may further be based on resetting the duty width to a value higher than the re-calculated duty width in a way that yields a zero signal level for a nonzero time duration between each half-cycle of the nonsinusoidal signal waveform. The value to which the duty width is reset may be 108% of the re-calculated duty width.

In an embodiment, the nonsinusoidal signal waveform is sampled at multiple instants within a given cycle, and determining whether the load is demanding less power over time is based on the sampling within the given cycle. Adjusting the duty width may include zeroing the nonsinusoidal signal waveform when or after a predetermined condition is satisfied. The determination as to whether the load is demanding less power over time may include a comparison of a change in samples representing the nonsinusoidal signal waveform during the given cycle against a threshold, e.g., a difference of 5 volts.

Another embodiment is a system that includes a processor for performing computing functions, an active power factor correction (PFC) controller, and an uninterruptible power supply (UPS) for delivering a generated nonsinusoidal signal waveform with a desired signal characteristic to a load including the processor and the active PFC controller. The UPS adjusts a duty width of the nonsinusoidal signal waveform based on a determination that the load is demanding more or less power over time. The determination is based on output signal samples of the nonsinusoidal signal waveform.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
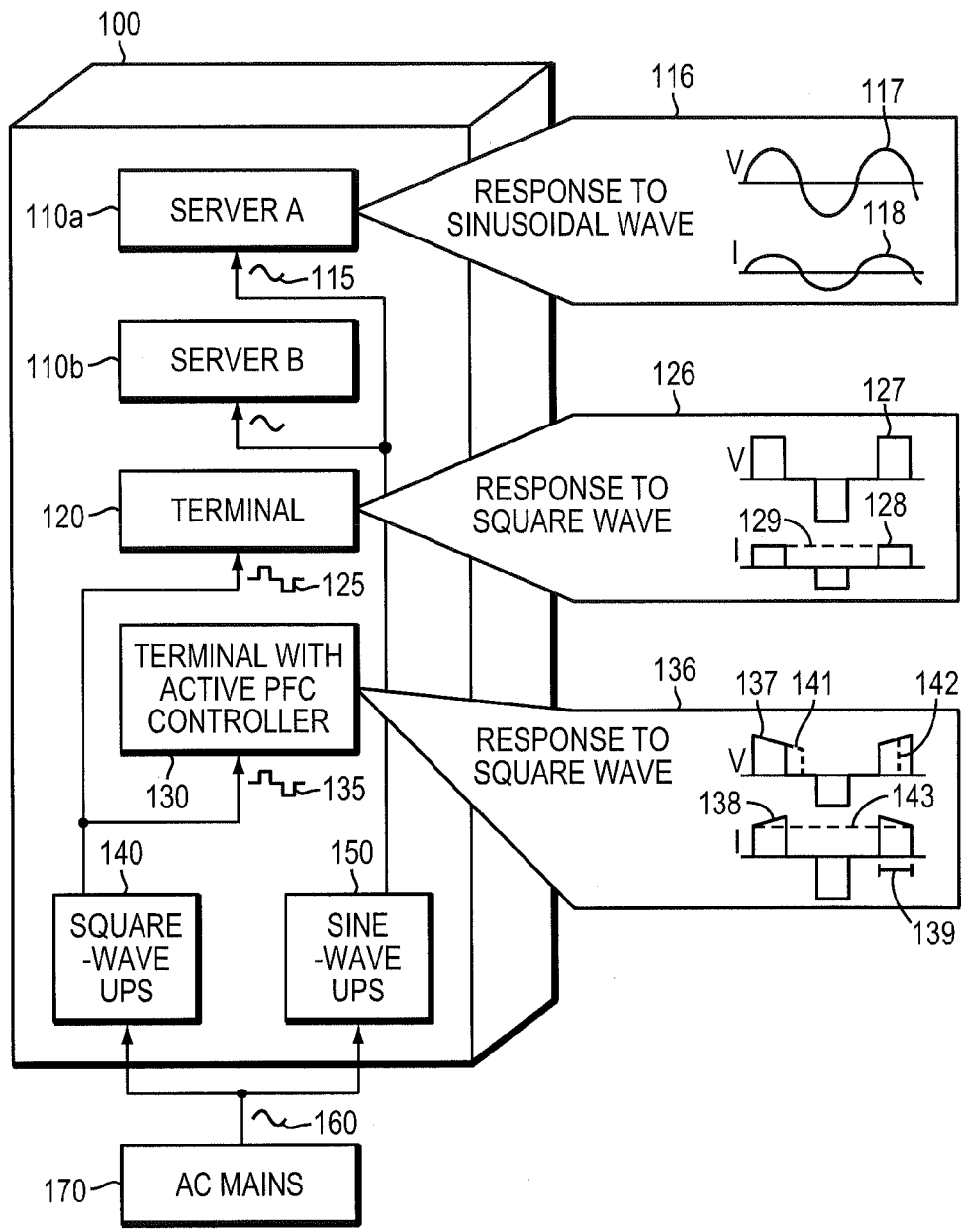
FIG. 1 is an example server room configuration in accordance with an embodiment of the invention.

A description of example embodiments of the invention follows.

Uninterruptible Power Supply (UPS) systems with nonsinusoidal waveforms (in particular, square waveforms) have been found to be incompatible with a particular class of load characterized as an active power factor correction (PFC) load (i.e., having an active PFC controller). A general description of square waveforms and power factor correction, including active PFC, follows.

A square waveform (square wave) is a periodic waveform that typically includes, in one cycle, a "high" (constant) signal level for a given duration (duty width), followed by a region of zero signal level, and then a "low" signal level. Pulse width modulation is typically employed with square waves in UPS systems to modulate the duty width to achieve a desired output characteristic, such as a desired root mean square (RMS) voltage.

The power factor of a system, a dimensionless quantity between 0 and 1, is the ratio of the system's true power to its apparent power. True power (or real power), measured in Watts, is the actual amount of power dissipated (i.e., used), indicative of the capacity of the system to perform work over time. True power is a function of the resistive (dissipative) elements of a circuit (e.g., resistors). Apparent power (measured in Volt-Amperes) is the product of the current and voltage of the system. When reactive elements (e.g, inductors or capacitors) are present, the current and voltage are not in phase, causing the power to be negative for a portion of each cycle. Thus, some power delivered during a portion of each cycle is returned during another portion, causing true power to be less than apparent power. In other words, apparent power, which is a function of impedance, is greater than true power if reactive elements are present in the system.

Reactive loads (systems) are burdensome to utility providers in terms of infrastructure requirements, since power is wasted in the resistance of electric lines between the generator (power grid) and the (reactive) load. Therefore, power factor correction (PFC) techniques have been developed to increase the power factor of reactive loads.

Passive PFC uses passive circuit elements (e.g., inductors or capacitors) to compensate for the reactance of the load. For example, a load's inductive reactance can be compensated by adding another load drawing an equal and opposite amount of reactive power (e.g., a capacitive reactance, such as with a capacitor added in parallel). This technique results in the circuit's total impedance being nearly equal to the resistance, resulting in a power factor near 1.

Active PFC, in contrast, uses a separate circuit (not just passive circuit elements) to compensate for the reactive load. Active PFC draws power resistively from the line in order to supply power to the reactive load. This technique isolates the load from the line and results in better power factor correction than with passive PFC.

The use of PFC load design has become more popular recently, and many regulations require the use of PFC. However, the use of active PFC loads introduces challenges for uninterruptible power supply (UPS) technologies using square waveforms. Embodiments of the present invention address these challenges and are applicable to the UPS topologies of FIGS. 1 and 3, inverter configurations as in FIG. 2, as well as other UPS and inverter configurations.

FIG. 1 is an example server room configuration in accordance with an embodiment of the invention. The server room 100 includes several devices, e.g., computing devices, including server A 110a, and server B 110b. In order to protect high-value equipment, such as servers, against power outages, a UPS 150 providing sinusoidal waveforms is connected to server A 110a and server B 110b. The UPS 150 draws AC power 160 from mains (grid) 170. In case of a power outage, the sinusoidal waveform UPS 150 delivers a sinusoidal waveform 115 to server A 110a. As shown by expanded view 116, delivered voltage 117 and current 118 are in phase with one another.

Lower-value equipment, such as terminals, may be protected via less expensive UPS systems, which may provide nonsinusoidal waveforms, such as square waves. FIG. 1 shows a square wave UPS connected to a terminal 120, representing a passive PFC load, and to a terminal 130 with an active PFC controller not shown. The square waveform UPS 140 also draws AC power 160 from the mains 170. In the example embodiment of FIG. 1, the square wave 125 delivered to the passive PFC terminal 120 and the square wave 135 delivered to the active PFC terminal 130 are shown in respective expanded views 126 and 136; this situation corresponds to functionality during power blackouts, for example. The output voltage 127 and current 128 delivered to the passive PFC terminal 120 in a power outage condition are well-behaved square waves. The delivered output current 128 does not exceed a maximum current rating 129, as indicated by a horizontal dashed line.

Active PFC loads, such as an active PFC controller, are typically designed to operate well under nominal line conditions. However, when an active PFC load is connected to a square wave UPS in battery mode (e.g., in the case of a power outage), the active PFC load will typically start demanding (i.e., consuming) power, resulting in a decrease in the output voltage 137 of the square wave UPS 140. In other words, the load represented by the terminal 130 with active PFC controller draws the current 138 rapidly during this time (from the UPS) in order to recover from the abnormal conditions (power shortage) and maintain a power characteristic (e.g., according to a specified power requirement of the load, as regulated by the active PFC controller). In fact, the current may exceed the maximum tolerance 143, possibly damaging the UPS or causing the UPS to disable its output to protect itself, resulting in dropped load or damage to user equipment. Devices with higher power ratings may be unaffected, but higher power ratings result in higher cost of hardware design. The load may then continue to overdraw current, for example, to charge an internal capacitor of the load (not shown). The load reduces power consumption during an interval 139 when the load does not need to draw a large current from the square wave UPS 140 anymore. During the interval 139 of low power draw, the output voltage 137 rises back to a level based on the battery voltage of the UPS.

According to an embodiment of the present invention, a case of falling voltage 137 is detected, and the duty width of the voltage signal 137 is extended (141) in compensation. A case of rising voltage (e.g., during interval 139) is detected, and the duty width of the voltage signal is (142) decreased in compensation, e.g., by zeroing the voltage signal.

It should be understood that, although the example embodiment described above is presented with respect to voltages, currents may also be used in embodiments of the invention. As described herein, the term "signal" may refer to the case of either voltage or current. One of ordinary skill in the art should appreciate that technologies such as current-controlled voltages and sense resistors may be employed to interchange between voltage embodiments and current embodiments in order to adapt the presently described techniques to different implementations.

The foregoing behavior of an active PFC load connected to a square wave UPS in the event of a power shortage results in numerous problems. As mentioned earlier, overloaded current can damage the connected device. Also, rapid output voltage changes in each half cycle of the waveform can be problematic, resulting in peak voltage fluctuation (unstable voltage regulation). Power consumption by the load can be unpredictable in this situation, as some PFC loads have been observed to stop and resume consumption of power in unpredictable manners. Finally, square wave UPS systems may be designed to shutdown in such situations in order to protect themselves from dangerous conditions, defeating the purpose of a UPS system.

Embodiments of the present invention address the foregoing deficiencies of prior art UPS systems with nonsinusoidal voltage waveforms connected to active PFC loads. Square waveforms are discussed herein, although other nonsinusoidal waveforms are applicable as well.

Embodiments of the invention maintain stable output power from a square wave UPS to active PFC loads by stabilizing output true RMS voltage to the loads.

An embodiment of the invention monitors the square wave RMS output voltage of each pulse and compares it with the nominal RMS output voltage. If a pulse's RMS output voltage is lower than the nominal RMS output voltage, the output pulse duty width is increased to make the RMS output voltage reach (or get closer to) the nominal RMS output voltage. If a pulse's RMS output voltage is greater than the nominal RMS output voltage, the output pulse duty is turned off so that the RMS output voltage is limited to the nominal RMS output voltage. In this embodiment, all pulses are monitored and adjusted when needed.

Another embodiment of the invention monitors a square wave pulse type and the RMS output voltage of each pulse. For pulses with rising output peak voltage, the output pulse duty is turned off when the pulse's RMS output voltage has reached the nominal RMS output voltage. A rise of 5 V for a 120 V system may be used to identify this type of pulse (rising output peak voltage). For pulses with falling output peak voltage, the ouptut pulse duty width is increased to reach (or get closer to) the nominal RMS output voltage. A fall of 5 V for a 120 V system may be used to identify this type of pulse (falling output peak voltage).

Figure 2:
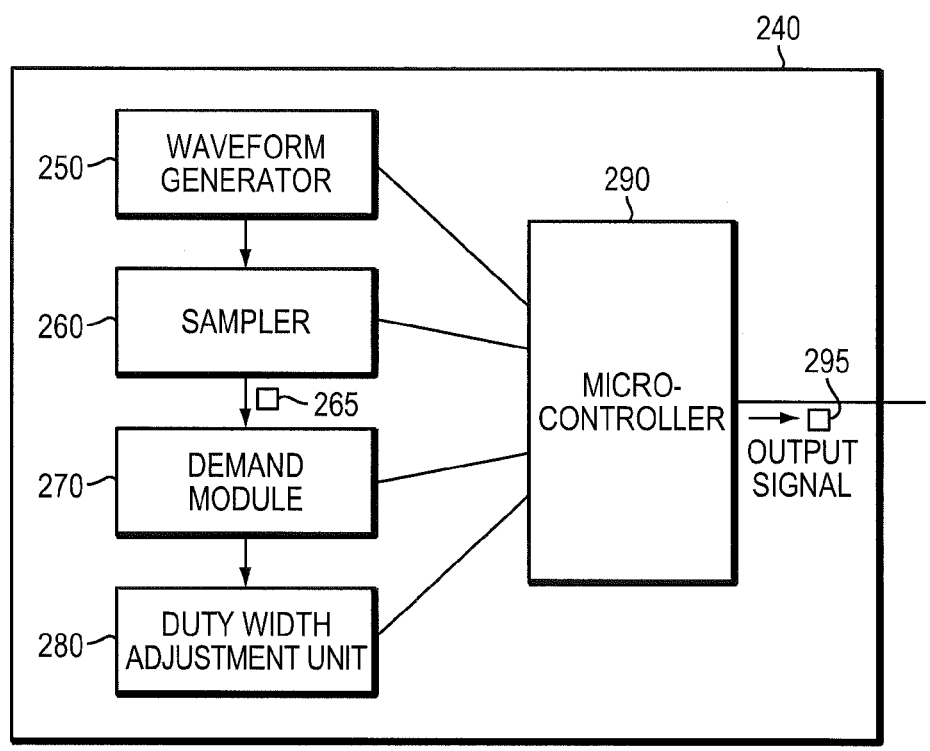
FIG. 2 is a block diagram of an uninterruptible power supply (UPS) in accordance with an embodiment of the invention.

FIG. 2 is a block diagram of an uninterruptible power supply (UPS) in accordance with an embodiment of the invention. FIG. 2 shows a nonsinusoidal waveform UPS 240 which may be connected to an active PFC load according to techniques described herein without the negative effects described above in the context of conventional technology. The UPS 240 includes a waveform generator 250, the output of which is sampled by a sampler 260 The resulting output signal samples 265 (current or voltage) are sent to a demand module that determines, based on the output signal samples 265, whether the load is demanding more or less power over time. Based on that determination, a duty width adjustment unit 270 may adjust the duty of the waveform. A microcontroller 290 or other processor or logic may control the components described above to contribute to the delivery of an output signal 295 that does not suffer from the deficiencies of conventional technology, as described previously.

Figure 3:
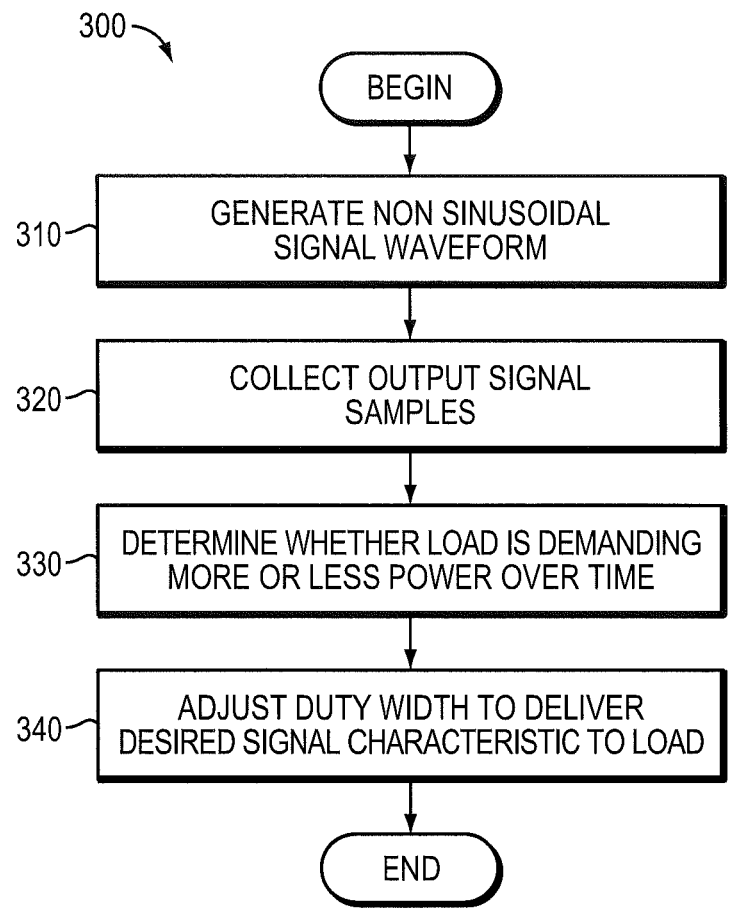
FIG. 3 is a flow diagram in accordance with an embodiment of the invention.

FIG. 3 is a flow diagram 300 in accordance with an embodiment of the invention. In the process 300, a nonsinusoidal signal waveform is generated (310). The nonsinusoidal signal waveform may be a nonsinusoidal voltage waveform or a nonsinusoidal current waveform. Output samples, e.g., output voltage samples, are collected (320). The process 300 includes determining whether the load is demanding more or less power over time (330). The duty width of the nonsinusoidal signal is adjusted (340) to deliver a desired signal characteristic, e.g., a root mean square (RMS) signal level, to the load.

Figure 4:
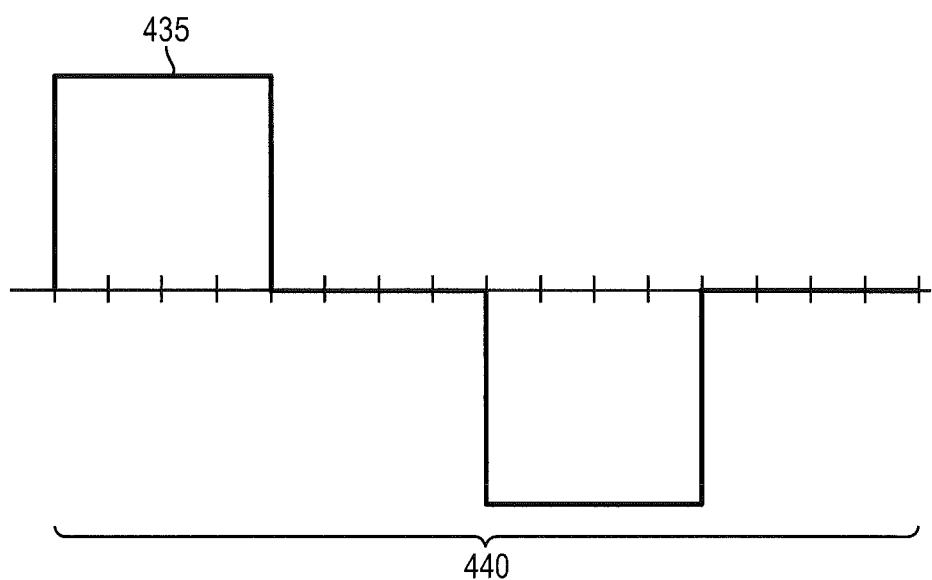
FIG. 4 is a signal diagram depicting sampling in accordance with an embodiment of the invention.

FIG. 4 is a signal diagram depicting sampling in accordance with an embodiment of the invention. Each period of the periodic waveform 435 may be subdivided into 16 time slices (shown generally as 440) or 32 ticks for purposes of sampling.

Figure 5:
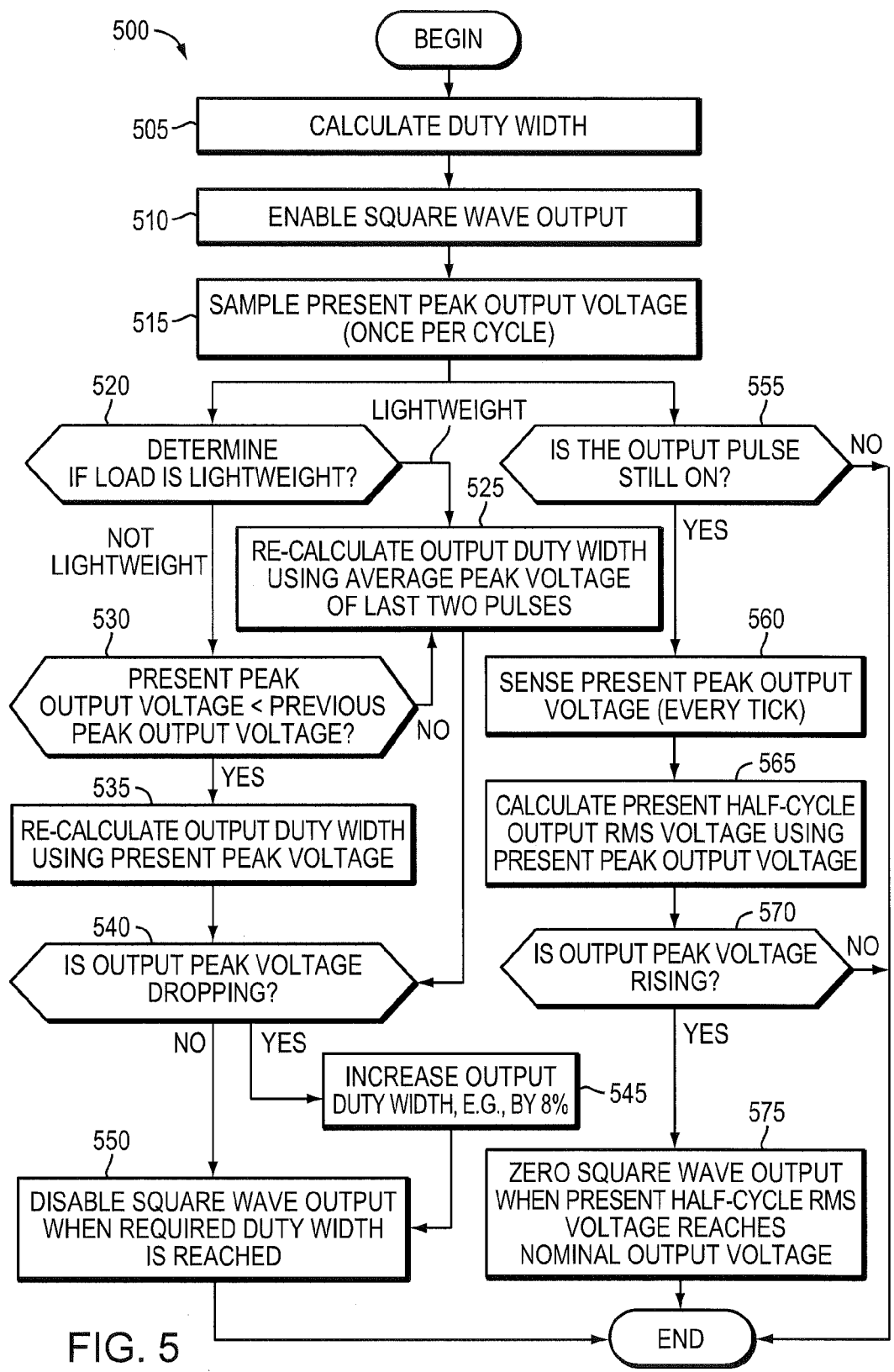
FIG. 5 is a detailed flow diagram in accordance with an embodiment of the invention.

FIG. 5 is a detailed flow diagram in accordance with an embodiment of the invention. In an embodiment, the non-sinusoidal waveform is generated using pulse width modulation (PWM). The duty width of the waveform is initially calculated (505) as $$D := \left(\frac{Vrms}{Vpeak}\right)^2$$

where D is the duty width (also known as duty cycle) of the waveform, Vpeak is peak voltage, and Vrms is the desired RMS voltage to be delivered to the load.

Depending on the configuration of the UPS system's inverter, the PWM may be used to control an electromagnetic field in a transformer or to control power switches configured to control power delivery to the load according to the PWM.

After output of the square waveform is enabled (510), the output voltage is sampled, and the duty width is adjusted to control the nonsinusoidal voltage waveform as a function of the output voltage samples to deliver a desired root mean square (RMS) voltage to the load. The method of adjustment varies depending on the results of the sampling, as described below.

On a cycle-to-cycle basis (preferably once per cycle but possibly once every other cycle or according to other inter-cycle sampling employed), samples are gathered (515) at a point offset from the start of each cycle according to one of the following rules: 1) less than one-half of the period of the cycle; 2) less than one-quarter of the period of the cycle; or 3) about one-eighth of the period of the cycle (plus or minus 5 percent of the period or some other percentage consistent with operational parameters or other criteria). For example, the sampling time corresponding to option (3) above is the second time slice. Sampling the output voltage early in the cycle is useful, but not at the very beginning, since fluctuations may be present at the very beginning.

When the load is determined to be relatively light (520), e.g., less than 20% of the maximum power rating for the UPS system, it may be necessary to protect a transformer component of the UPS against saturation, since drawing higher current suddenly can cause the output voltage to drop sharply. This case applies to low frequency (LF) design. In this case, re-calculating the duty width based on an average of the present cycle's output voltage sample and the previous cycle's sample (525) mitigates against effects of voltage fluctuations. In other words, the following formulas may be used:

$$Vpeak := \frac{Vprevious\_peak + Vpresent\_peak}{2}$$

$$D := \left(\frac{Vrms}{Vpeak}\right)^2$$

Other averaging or filtering techniques may be used as well, for example, averaging the past three cycles.

If the present cycle's peak output voltage is not less than the previous cycle's peak output voltage (530), then the above averaging technique is used to re-calculate the output duty width. Otherwise, the output duty width is re-calculated using the present peak voltage (535).

If the output voltage is obviously dropping (540), e.g., dropping by more than a threshold such as a difference of 10 V, then embodiments of the invention compensate for the steep voltage drop by increasing the duty width (545). The duty width may be increased within hardware limitations so as to preserve a region of zero voltage between high and low voltage regions of the waveform. In this way, the output voltage delivered to a load may be brought closer to a desired root mean square (RMS) voltage (since increasing the duty width compensates for the falling peak voltage). In one embodiment, the duty width is reset to 108% of the re-calculated duty width. The duty width may be increased by other factors as well.

The square wave output is disabled when the required duty width, i.e., the reset duty width, is reached (550). This condition may be detected based on a timer compare value which indicates when to disable the output voltage signal.

Figure 6:
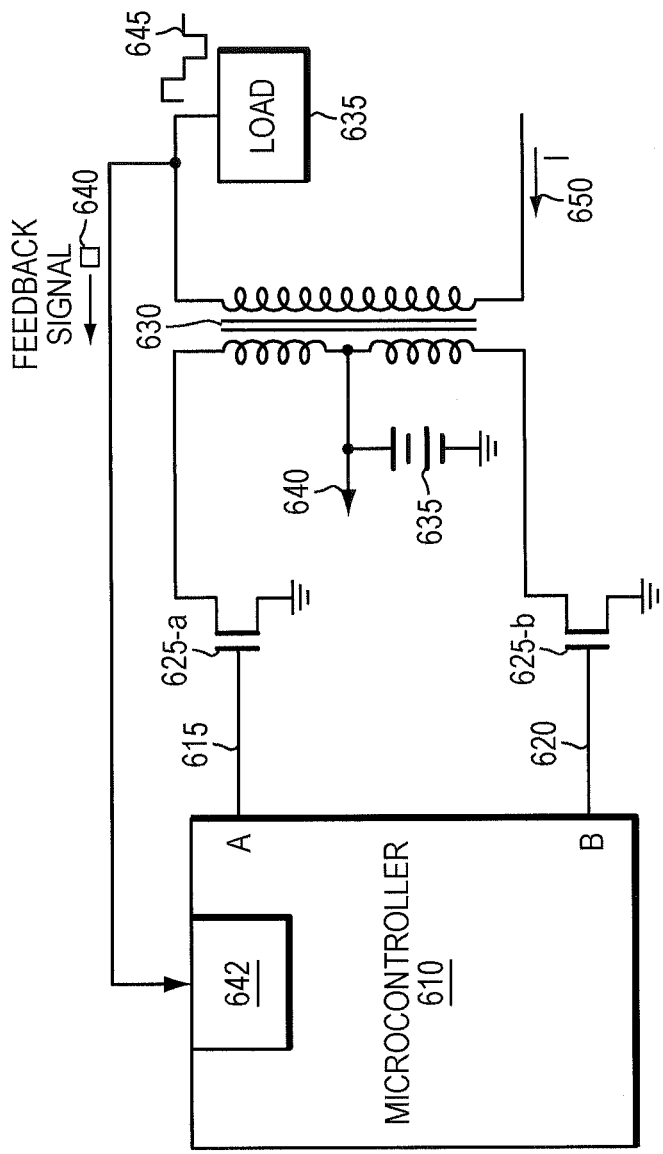
FIG. 6 is a circuit diagram corresponding to low frequency transformer operation in accordance with an embodiment of the invention.

FIG. 6 is a circuit diagram corresponding to low frequency UPS operation in accordance with an embodiment of the invention. This circuit diagram is an example hardware implementation, although other hardware implementations are envisioned as well. For example, sense resistors may be used for current-based implementations, as would be appreciated by one of ordinary skill in the art, as described previously. In FIG. 6, a microcontroller 610 provides control signals, supply output A 615 and supply output B 620 to a pair of switches 625-a and 625-b, which may be implemented with MOSFET technology, coupled to a push-pull transformer 630. Push-pull (buck boost) transformers are generally used in power engineering to change the voltage of a DC power supply, i.e., for DC-to-DC conversion. The voltage associated with a battery 635 may be fed back to the microcontroller 610 for processing, e.g., to adjust the duty width according to embodiments of the invention. A load 635 draws an output voltage 645, which may be fed back (640) to the microcontroller 610, e.g., at a port 642 configured to receive such a signal, for further processing, e.g., for sampling and duty width adjustment. In another embodiment, an output current 650 may be fed back to the microprocessor 610 for further processing. Thus, embodiments of the invention may sample the output voltage, the output current, or the battery voltage and use the samples to adjust duty width.

Figure 7:
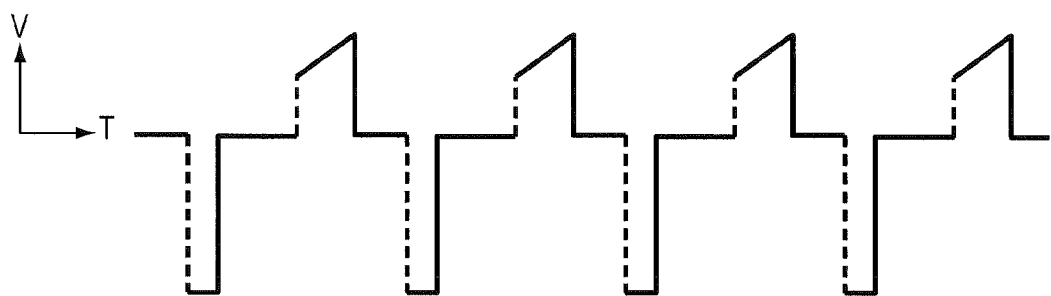
FIG. 7 is a signal diagram illustrating a condition associated with connecting a lightly loaded active PFC to a UPS.

FIG. 7 is a signal diagram illustrating a condition associated with transformer saturation during low frequency operation in accordance with an embodiment of the invention. With a light load, for some active PFC controllers, the load consumes power quickly, resulting in an unbalanced output voltage as shown in FIG. 7. Also, this condition can result in unbalanced usage of inverter MOSFETs in the UPS system.

For high frequency (HF) design, there are no comparable transformer saturation considerations. Therefore, the following formulas may be used:

$$Vpeak := Vpresent\_peak$$

$$D := \left(\frac{Vrms}{Vpeak}\right)^2$$

Using only the present cycle's voltage sample in this case, instead of an average relating to the present cycle and past cycles, helps charge the load's internal DC bus faster.

Figure 8:
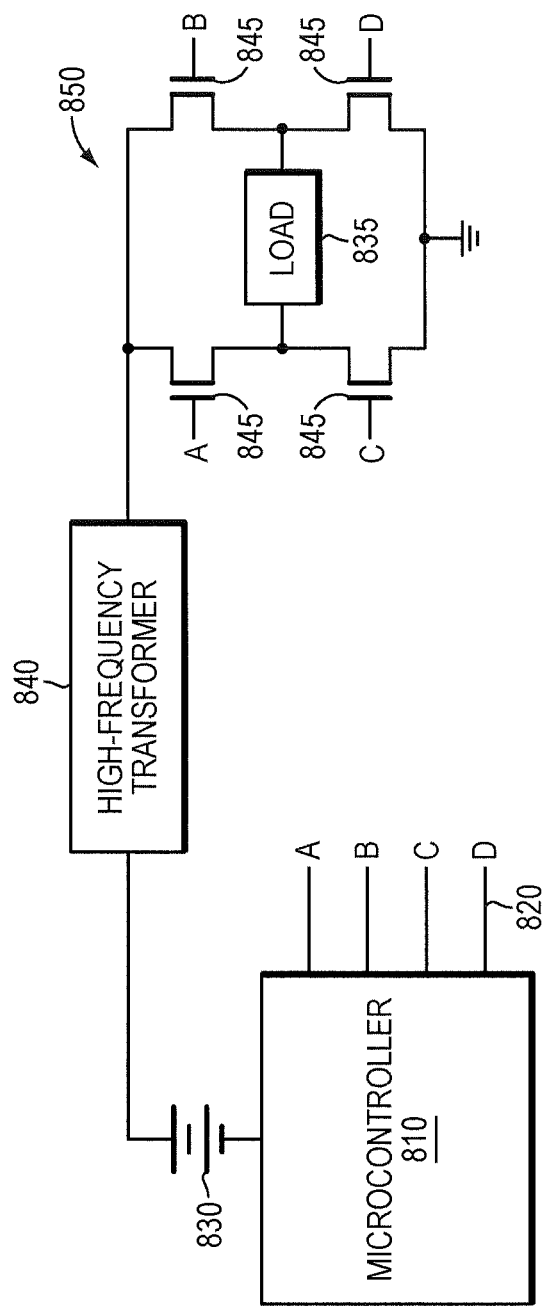
FIG. 8 is a circuit diagram corresponding to high frequency transformer operation in accordance with an embodiment of the invention.

FIG. 8 is a circuit diagram corresponding to high frequency transformer operation in accordance with an embodiment of the invention. This circuit diagram is an example hardware implementation, although other hardware implementations are envisioned as well. A microcontroller 810 generates a nonsinusoidal waveform, samples output voltage, and adjusts duty width according to embodiments of the invention. The microcontroller provides between two and six outputs 820 in embodiments of the invention. A battery 830, a high-frequency transformer 840, and an H-bridge 850 are used in this implementation. In the example configuration shown in FIG. 8, microcontroller outputs 820 labeled A, B, C, and D are coupled to corresponding switches 845 of the H-bridge 850 labeled A, B, C, D. Different pairs of switches 845 diagonally across the load 835 (e.g., A/D or B/C) in the H-bridge 850 may be turned on or off to change the polarity of power delivered to a load 835. It should be understood by one of ordinary skill in the art that less than 2 or greater than six microcontroller outputs could also be used to control the switches 845, depending on different control signal configurations used to control the load.

Thus, embodiments of the invention apply respectively to low frequency and high frequency UPS designs.

Referring back to FIG. 5, in other embodiments of the invention, if the output pulse is still on (555), the output voltage is sampled at multiple instants within a given cycle, e.g., at every tick, although other intra-cycle sampling methods may be used (560). The present half-cycle output RMS voltage, i.e., the RMS voltage of the output voltage samples encountered so far in the given cycle, is calculated (565). If the output voltage detected to be rising (570), e.g., based on a difference in samples greater than a threshold such as a 5 V difference, then the PFC load is known to be demanding less power over time, i.e., reducing power consumption. In this case, the voltage waveform is zeroed (set to zero voltage) if the present half-cycle output RMS voltage has reached the desired (nominal) output RMS voltage (575).

Thus, when the PFC load stops drawing a large current from the square wave UPS, embodiments of the invention track the output voltage and disable it (e.g., zero it) when it reaches the nominal output voltage (e.g., 115 V in the United States) precisely.

In this situation, the internal DC bus of the load is not at a low voltage level, and embodiments of the present invention maintain the output voltage at the nominal voltage precisely so that the load will not be over-charged.

With this strategy, both the PFC load and the square waveform UPS output become stable. Thus, embodiments of the present invention resolve the incompatibilities of square wave UPS with active PFC loads.

Figure 9A:
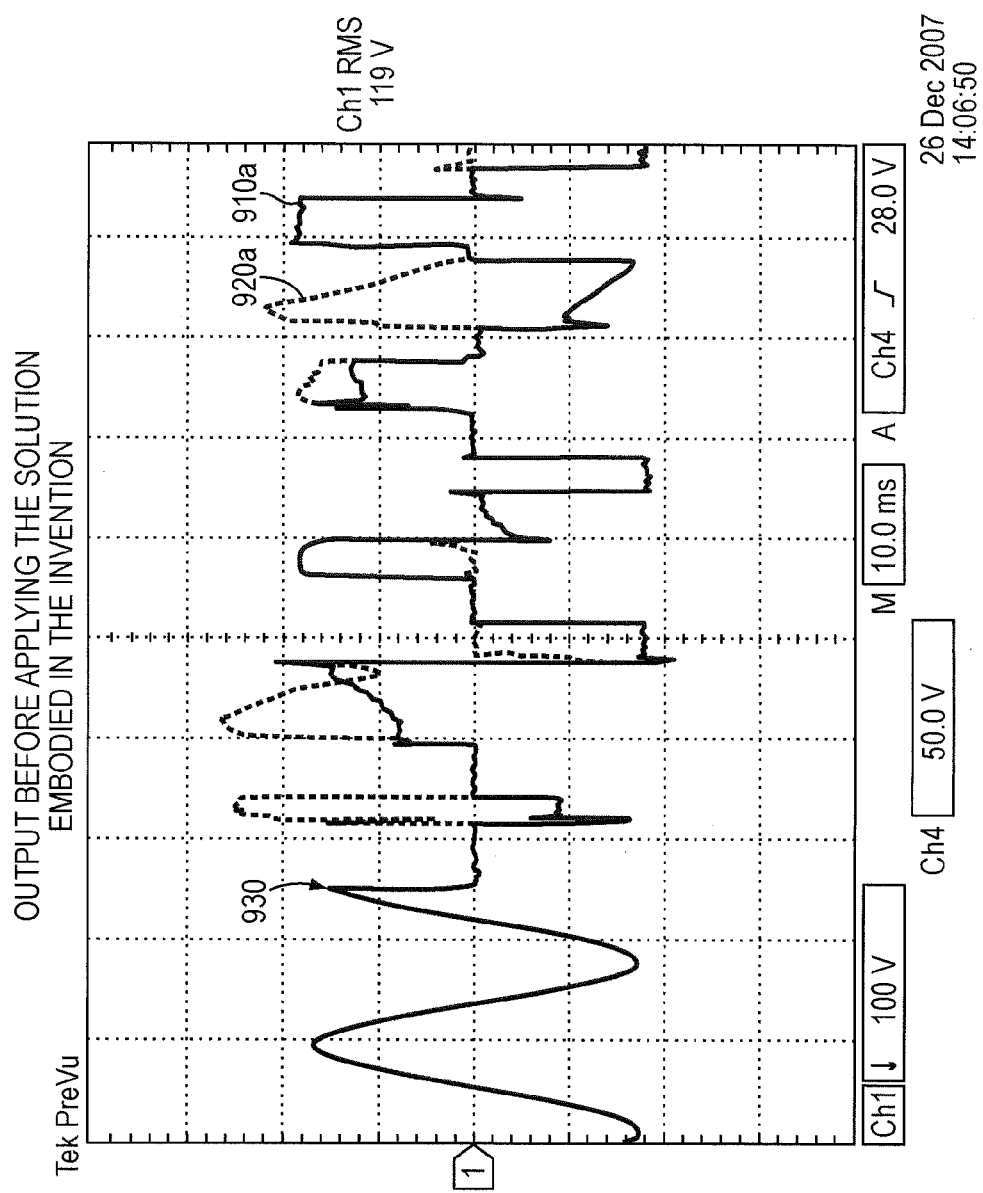
FIGS. 9a-c are signal traces showing signal waveforms in accordance with an embodiment of the invention.
Figure 9B:
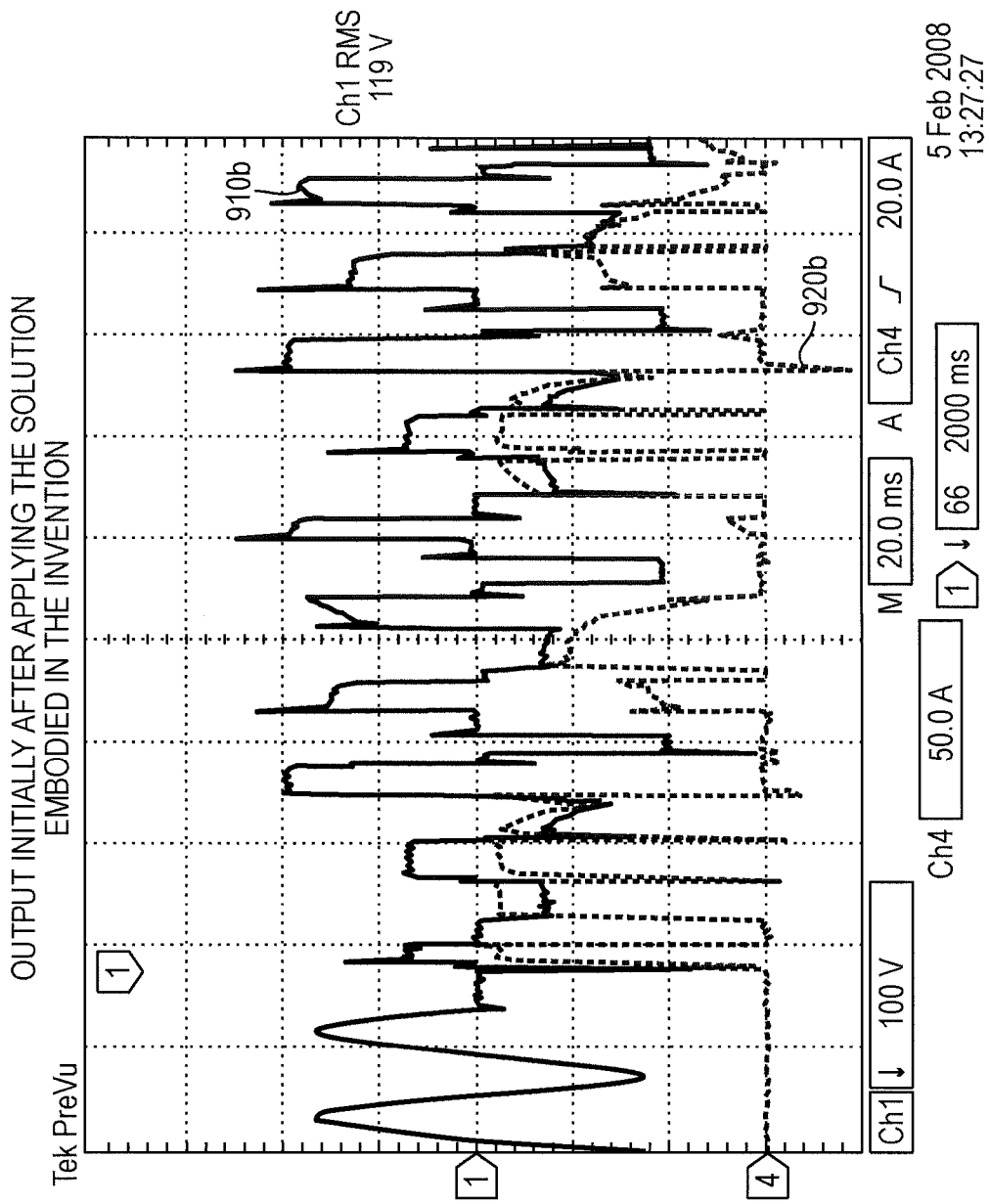
Figure 9C:
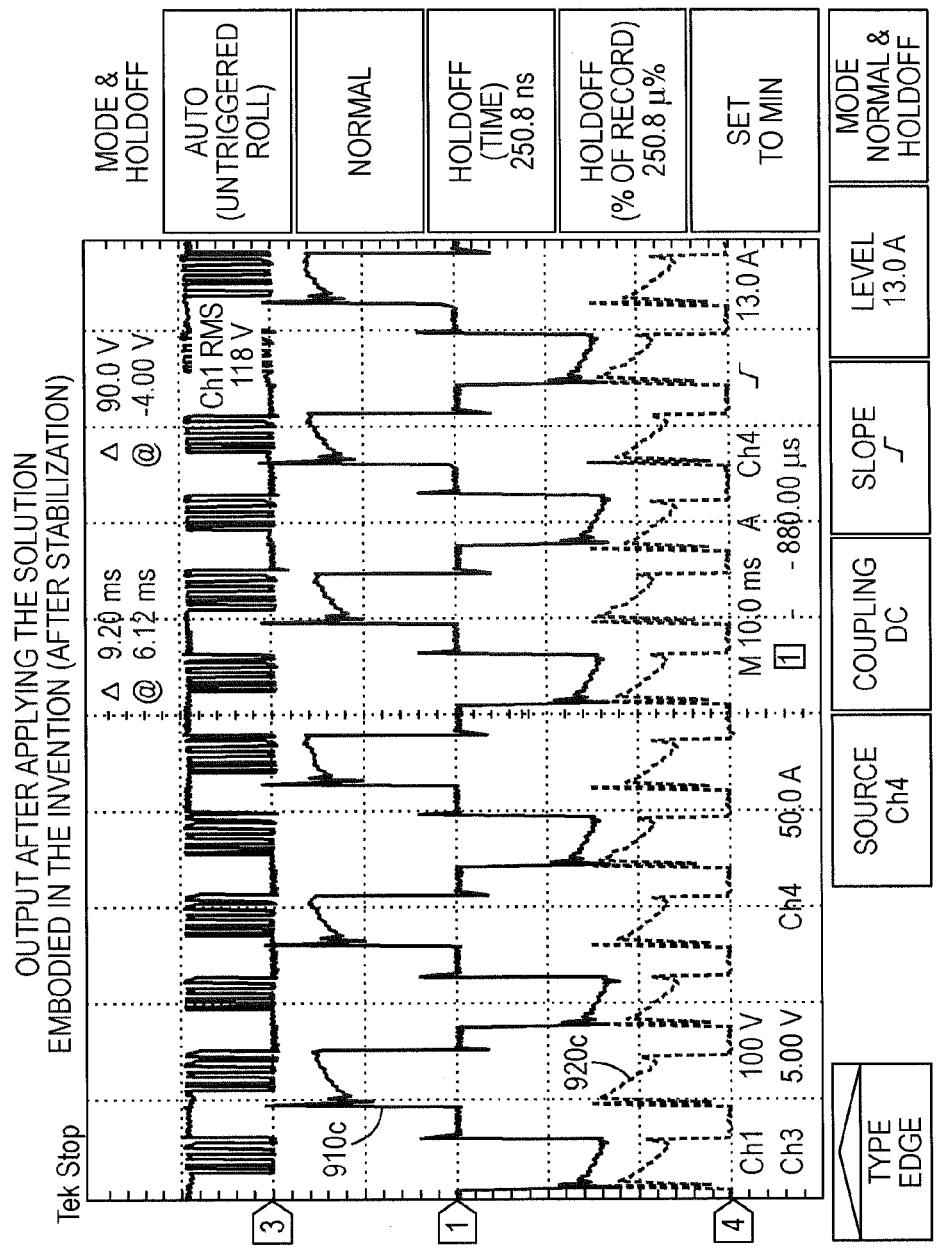

FIGS. 9A-C are signal traces showing signal waveforms in accordance with an embodiment of the invention. The techniques described herein have been tested with square wave UPS systems and active PFC loads, and FIGS. 9A-C demonstrate the efficacy of embodiments of the invention. FIG. 9A shows output voltage 910-a and output current 920-a when an active PFC load draws power from a square wave UPS after a power outage 930, without applying embodiments of the present invention. The output voltage is seen to fluctuate (indicative of poor voltage regulation), and the output current is seen to surge. FIG. 9B shows the result of applying embodiments of the invention. Output voltage 910-b and output current 920-b are seen to be better regulated. FIG. 9C shows the result of applying embodiments of the invention and waiting until circuit behavior has stabilized. Output voltage 910-c and output current 920-c are seen to be well-regulated periodic waveforms.

Embodiments of the invention may be implemented in hardware, firmware, or software to enable compatibility between nonsinusoidal UPS systems and active PFC loads. In some embodiments, no additional hardware components are required beyond square wave UPS systems already available, thus minimizing cost. In other words, software may be executed to control the nonsinusoidal voltage waveform. The software may be in the form of instructions stored on a computer-readable medium, which, when executed, cause a processor to perform the processes described above and in FIGS. 3 and 5.

With embodiments of the invention, the unstable transient state of the UPS system is shortened, stabilizing the UPS output. Thus, the capability of the UPS system to support PFC loads is improved.

While this invention has been particularly shown and described with references to example embodiments thereof, it will be understood by those skilled in the art that various changes in form and details may be made therein without departing from the scope of the invention encompassed by the appended claims.

The disclosed embodiments can be applied to any UPS topology, such as off-line, line-interactive, or double conversion.

Figure 10:
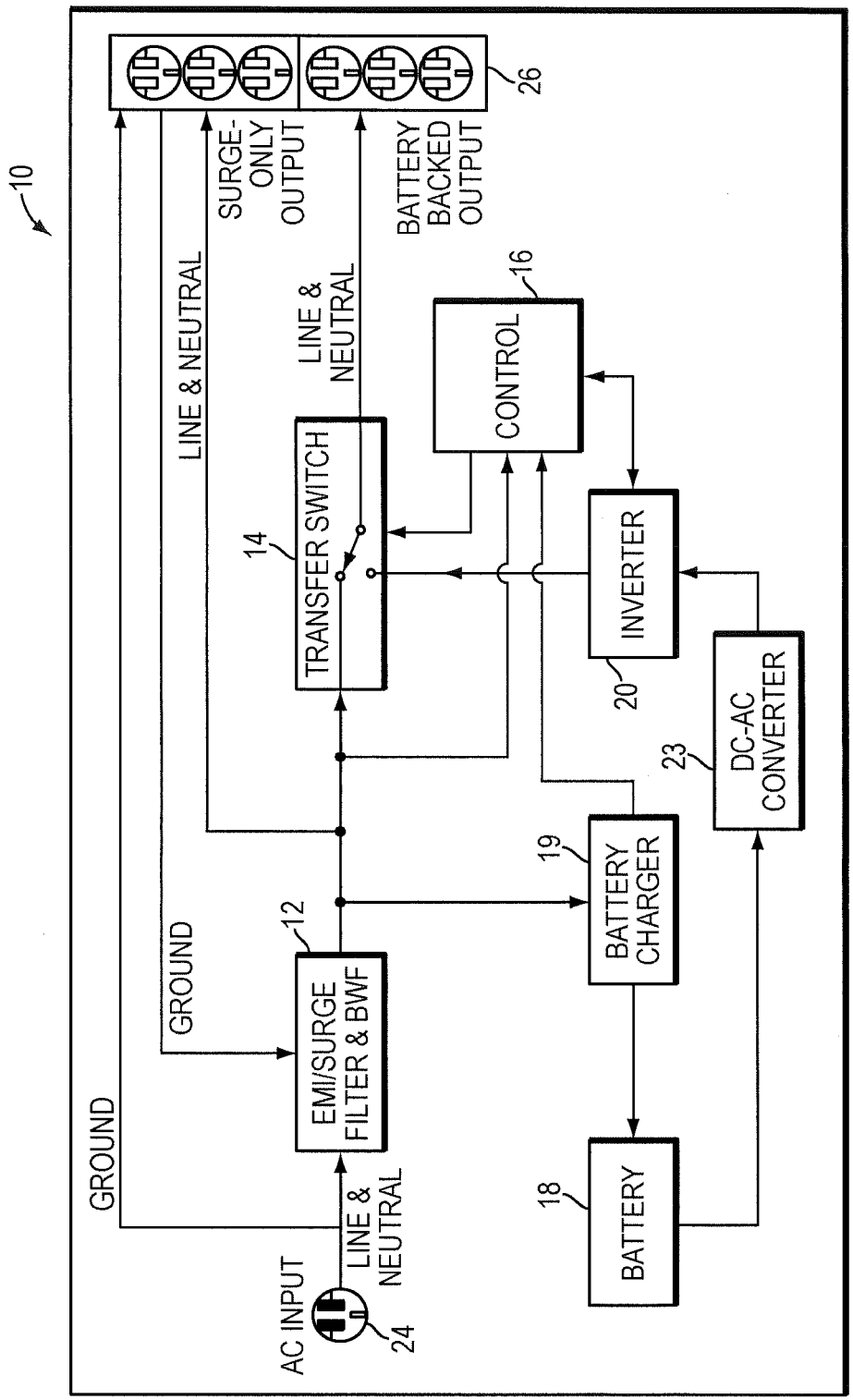
FIG. 10 is a block diagram of a prior art standby (offline) topology for a UPS used to provide regulated uninterrupted power.

FIG. 10 is a block diagram of a typical prior art UPS 10 used to provide regulated uninterrupted power in an off-line (standby) UPS topology. The UPS 10 includes an input filter/surge protector 12, a transfer switch 14, a controller 16, a battery 18, a battery charger 19, an inverter 20, and a DC-DC converter 23. The UPS also includes an input 24 for coupling to an AC power source and an outlet 26 for coupling to a load (not shown).

The UPS 10 operates as follows. The filter/surge protector 12 receives input AC power from the AC power source through the input 24, filters the input AC power and provides filtered AC power to the transfer switch 14 and the battery charger 19. The transfer switch 14 receives the AC power from the filter/surge protector 12 and also receives AC power from the inverter 20. The controller 16 determines whether the AC power available from the filter/surge protector 12 is within predetermined tolerances, and if so, controls the transfer switch 14 to provide the AC power from the filter/surge protector 12 to the outlet 26. A rectifier (not shown) is used to convert alternating current (AC) to direct current (DC) for passing through the battery 18.

If the AC power from the rectifier is not within the predetermined tolerances, which may occur because of "brown out," "high line," or "black out" conditions, or due to power surges, then the controller 16 controls the transfer switch to provide the AC power from the inverter 20. The DC-DC converter 23 is an optional component that converts the output of the battery 18 to a voltage that is compatible with the inverter 20. Depending on the particular inverter and battery used the inverter 20 may be operatively coupled to the battery 18 either directly or through a DC-DC converter.

The inverter 20 of the prior art UPS 10 receives DC power from the DC-DC converter 23, converts the DC voltage to AC voltage, and regulates the AC voltage to predetermined specifications. The inverter 20 provides the regulated AC voltage to the transfer switch 14. Depending on the capacity of the battery 18 and the power requirements of the load, the UPS 10 can provide power to the load during brief power source "dropouts" or for extended power outages. In typical medium power, low cost inverters, such as inverter 20 of UPS 10, the Z waveform of the AC voltage has a rectangular shape rather than a sinusoidal shape.

Figure 11:
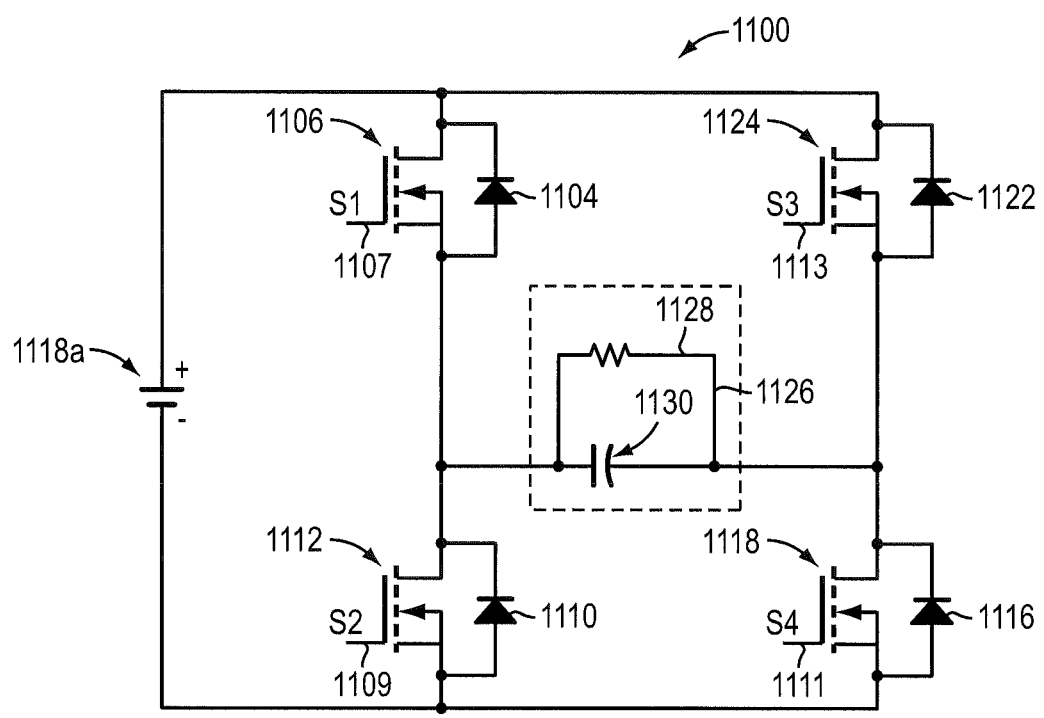
FIG. 11 is a circuit diagram of a typical prior art inverter circuit.

FIG. 11 is a circuit diagram of a typical prior art inverter circuit 1100 coupled to a DC voltage source 1118a and coupled to a typical load 1126 comprising a load resistor 1128 and a load capacitor 1130. The DC voltage source 1118a may be a battery (not shown).

Typical loads have a capacitive component due to the presence of an EMI filter in the load. The inverter circuit 1100 includes four switches S1, S2, S3, and S4 in a similar configuration as the switches 845 of FIG. 8. Each of the switches S1-S4 is implemented using power MOSFET devices which include respective transistors 1106, 1112, 1118, 124 having respective intrinsic diodes 1104, 1110, 1116, and 1122. Each of the transistors 1106, 1112, 1118 and 1124 has a gate, respectively 1107, 1109, 1111, and 1113. As understood by those skilled in the art, each of the switches S1-S4 can be controlled using a control signal input to its gate.

Figure 12:
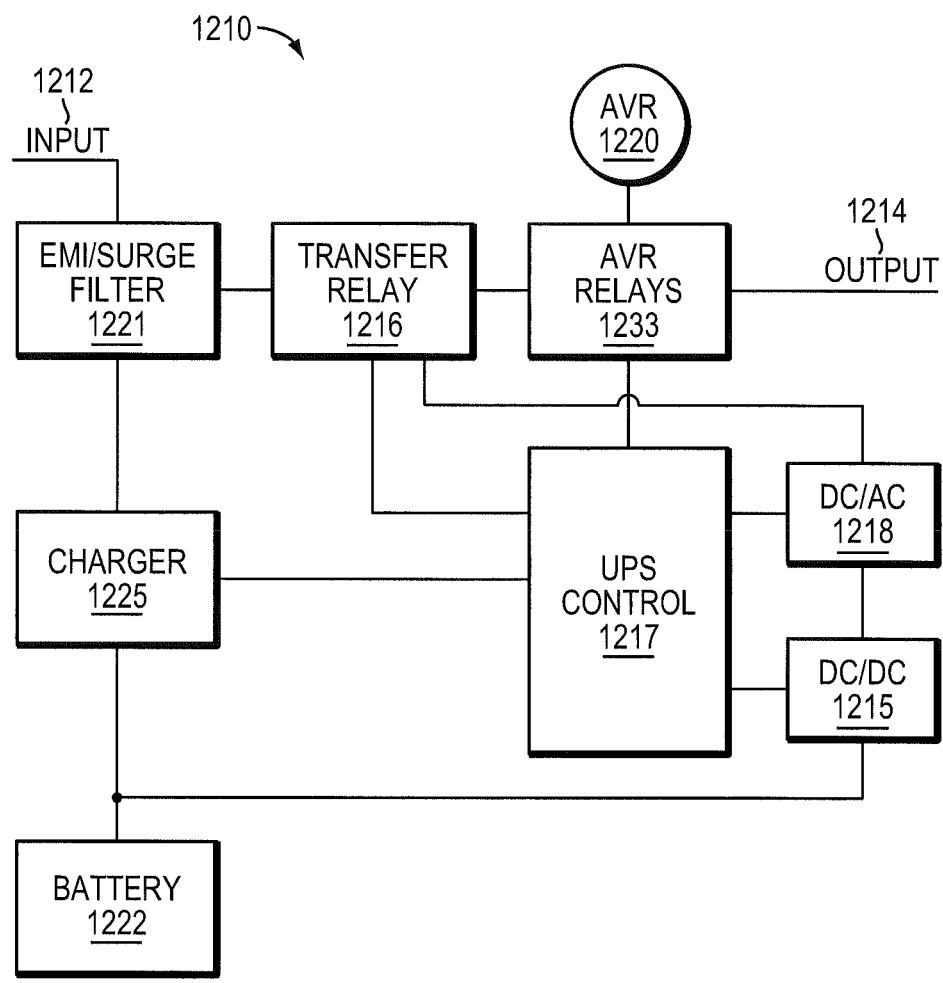
FIG. 12 is a block diagram of a line interactive UPS topology for providing AC power to a load.

FIG. 12 is a block diagram of a line interactive UPS topology for providing AC power to a load. One embodiment of an uninterruptible power supply in accordance with the present invention will now be described with reference to FIG. 12. The UPS 1210 includes an input 1212 to receive AC power from an AC power source, an output 1214 that provides AC power, a battery 1222 coupled to a DC to DC converter 1215, an inverter 1218 operatively coupled to the DC to DC converter 1215 to receive DC power and to provide AC power, a transfer relay 1216 selectively coupled to the UPS input 1212 and the inverter 1218, a UPS controller 1217, an EMI/Surge filter 1221, a battery charger 1225 and an automatic voltage regulation (AVR) transformer 1220 coupled to the transfer relay 1216, and at least one AVR relay 1233. The UPS 1210 further includes a UPS controller 1217 that monitors and controls the operation of the UPS 1210. The AVR 1220 and its associated relays are optional devices used in at least one embodiment to allow the UPS 1210 to operate over a wider range of input voltages.

The UPS 1210 operates as follows. The UPS 1210 receives input AC power from the AC power source through the input 1212, filters the input AC power and provides filtered AC power to the transfer relay 1216. The transfer relay 1216 receives the filtered power and also receives power from the DC/AC inverter 1218. The controller 1217 determines whether the power available from the AC power source is within predetermined tolerances, and if so, controls the transfer relay to provide the power from the AC power source to the output. If the power from the AC power source is not within the predetermined tolerances, which may occur because of "brown out" or "black out" conditions, or due to power surges, then the controller 1217 controls the transfer relay 1216 to provide the power from the inverter 1218.

The inverter 1218 of the UPS 1210 receives DC power from the DC-DC converter 1215 and converts the DC power to AC power and regulates the AC power to predetermined specifications. Depending on the capacity of the battery 1222 and the power requirements of the load, the UPS 1210 can provide power to the load during brief power source dropouts or for extended power outages.

Using data stored in associated memory, the controller 1217 performs one or more instructions and monitors and controls operation of the UPS 1210. In some examples, the controller 1217 may include one or more processors or other types of controllers. In one example, the controller 1217 is a commercially available, general purpose processor. In another example, the controller 1217 performs a portion of the functions disclosed herein on a general purpose processor and performs another portion using an application-specific integrated circuit (ASIC) tailored to perform particular operations. As illustrated by these examples, embodiments in accordance with the present invention may perform the operations described herein using many specific combinations of hardware and software and the invention is not limited to any particular combination of hardware and software components.

The associated memory of the controller 1217 includes data storage that stores computer readable and writable information required for the operation of the UPS 1210. This information may include, among other data, data subject to manipulation by the controller 1217 and instructions that are executable by the controller 1217 to manipulate data. The data storage may be a relatively high performance, volatile, random access memory such as a dynamic random access memory (DRAM) or static memory (SRAM) or may be a nonvolatile storage media such as magnetic disk or flash memory. Various embodiments in accord with the present invention can organize the data storage into particularized and, in some cases, unique structures to perform the aspects and functions disclosed herein. In addition, these data structures may be specifically configured to conserve storage space or increase data exchange performance.

What is claimed is:

1. An electronic device comprising:
a microcontroller, configured to generate a nonsinusoidal signal waveform for delivery to a load by the electronic device, the microcontroller responsive to the nonsinusoidal signal waveform delivered to the load, the microcontroller further configured to:
sample the nonsinusoidal signal waveform to collect output signal samples; and
adjust at least one parameter of the nonsinusoidal signal waveform by adjusting generation of the nonsinusoidal signal waveform responsive to an effect of the load on the nonsinusoidal signal waveform, the effect of the load being due to the load's demand for more or less power and determined from the output signal samples collected, wherein the electronic device is a server.

2. The electronic device of claim 1 wherein the at least one parameter includes duty width.

3. The electronic device of claim 1 wherein the load includes an active power factor correction (PFC) controller.

4. The electronic device of claim 1 wherein the microcontroller is further configured to:
sample the nonsinusoidal signal waveform to collect the output signal samples on a cycle-to-cycle basis;
sample the nonsinusoidal signal waveform at multiple instants within a given cycle of the nonsinusoidal signal waveform; and
determine whether the load is demanding less power over time based on a comparison of a change in samples representing the nonsinusoidal signal waveform during the given cycle against a threshold.

5. The electronic device of claim 1 wherein the microcontroller is further configured to:
sample the nonsinusoidal signal waveform to collect the output signal samples on a cycle-to-cycle basis;
sample the nonsinusoidal signal waveform at multiple instants within a given cycle; and
determine whether consecutive cycles indicate that the load is demanding more power over time by comparing a change in samples representing the nonsinusoidal signal waveform from cycle-to-cycle against a threshold.

6. The electronic device of claim 1 wherein the at least one parameter includes duty width and the microcontroller is further configured to:
sample the nonsinusoidal signal waveform to collect the output signal samples on a cycle-to-cycle basis;
sample the nonsinusoidal signal waveform at multiple instants within a given cycle; and
re-calculate the duty width using a current cycle's peak output voltage if the current cycle's peak output voltage is less than the previous cycle's peak output voltage and, otherwise, re-calculate the duty width based on an average of the current cycle's peak output voltage and the previous cycle's peak output voltage.

7. The electronic device of claim 1 wherein the at least one parameter includes duty width, the nonsinusoidal waveform is a nonsinusoidal voltage waveform, and further wherein the microcontroller is further configured to:
sample the nonsinusoidal signal waveform to collect output signal samples on a cycle-to-cycle basis;
sample the nonsinusoidal signal waveform at multiple instants within a given cycle; and
calculate a Root Mean Square (RMS) voltage for a present half cycle of a given cycle including all output voltage samples collected in the present half cycle and setting a voltage of the nonsinusoidal voltage waveform to zero if the RMS calculated has reached a nominal output voltage.

8. A method of controlling an output signal to be delivered to a load, the method comprising:
by a microcontroller of an electronic device, generating a nonsinusoidal signal waveform for delivery to the load;
by the microcontroller, sampling the nonsinusoidal signal waveform to collect output signal samples; and
by the microcontroller, adjusting at least one parameter of the nonsinusoidal signal waveform by adjusting the generating responsive to an effect of the load on the nonsinusoidal signal waveform, the effect of the load being due to the load's demand for more or less power and determined from the output signal samples collected, wherein the electronic device is a server.

9. The method of claim 8 wherein the at least one parameter includes duty width.

10. The method of claim 8 further comprising including an active power factor correction (PFC) controller in the load.

11. The method of claim 8 further comprising, by the microcontroller:
collecting the output signal samples on a cycle-to-cycle basis;
sampling the nonsinusoidal signal waveform at multiple instants within a given cycle of the nonsinusoidal signal waveform; and
determining whether the load is demanding less power over time based on a comparison of a change in samples representing the nonsinusoidal signal waveform during the given cycle against a threshold.

12. The method of claim 8 further comprising, by the microcontroller:
collecting the output signal samples on a cycle-to-cycle basis;
sampling the nonsinusoidal signal waveform at multiple instants within a given cycle of the nonsinusoidal signal waveform; and
determining whether consecutive cycles indicate that the load is demanding more power over time by comparing a change in samples representing the nonsinusoidal signal waveform from cycle-to-cycle against a threshold.

13. The method of claim 8 wherein the at least one parameter includes duty width, the method further comprising, by the microcontroller:
collecting the output signal samples on a cycle-to-cycle basis;
sampling the nonsinusoidal signal waveform at multiple instants within a given cycle of the nonsinusoidal signal waveform; and
re-calculating the duty width using a current cycle's peak output voltage if the current cycle's peak output voltage is less than the previous cycle's peak output voltage and, otherwise, re-calculating the duty width based on an average of the current cycle's peak output voltage and the previous cycle's peak output voltage.

14. The method of claim 8 wherein the at least one parameter includes duty width, the nonsinusoidal waveform is a nonsinusoidal voltage waveform, the method further comprising, by the microcontroller:
collecting the output signal samples on a cycle-to-cycle basis;
sampling the nonsinusoidal signal waveform at multiple instants within a given cycle of the nonsinusoidal signal waveform; and
calculating a Root Mean Square (RMS) voltage for a present half cycle of a given cycle including all output voltage samples collected in the present half cycle and setting a voltage of the nonsinusoidal voltage waveform to zero if the RMS calculated has reached a nominal output voltage.

15. The method of claim 8 further comprising:
adjusting the at least one parameter, in compensation for the load's demanding more or less power, to control the nonsinusoidal signal waveform in order to deliver a desired signal characteristic to the load, wherein the desired signal characteristic is a desired root mean square (RMS) signal level.

16. The method of claim 8, wherein the at least one parameter includes duty width, the method further comprising, by the microcontroller:
collecting the output signal samples on a cycle-to-cycle basis; and
sampling the nonsinusoidal signal waveform at multiple instants within a given cycle of the nonsinusoidal signal waveform, wherein, in a case of falling output signal samples, adjusting the at least one parameter includes increasing the duty width, and further wherein, in a case of rising output voltage samples, adjusting the at least one parameter includes decreasing the duty width, and optionally wherein decreasing the duty width matches the RMS signal level of output voltage samples to the desired RMS signal level.

17. The method of claim 8, further comprising, by the microcontroller:
sampling the nonsinusoidal signal waveform on a cycle-to-cycle basis; and determining whether the load is demanding more power over time based on consecutive cycles, wherein adjusting the at least one parameter includes increasing a duty width of the nonsinusoidal signal waveform to compensate for the load's demanding more power.

18. An electronic device comprising:
a microcontroller, configured to generate a nonsinusoidal signal waveform for delivery to a load by the electronic device, the microcontroller responsive to the nonsinusoidal signal waveform delivered to the load, the microcontroller further configured to:
sample the nonsinusoidal signal waveform to collect output signal samples; and
adjust at least one parameter of the nonsinusoidal signal waveform by adjusting generation of the nonsinusoidal signal waveform responsive to an effect of the load on the nonsinusoidal signal waveform, the effect of the load being due to the load's demand for more or less power and determined from the output signal samples collected, wherein the electronic device is a computer.

19. The electronic device of claim 18 wherein the at least one parameter includes duty width.

20. The electronic device of claim 18 wherein the load includes an active power factor correction (PFC) controller.

21. The electronic device of claim 18 wherein the microcontroller is further configured to:
sample the nonsinusoidal signal waveform to collect the output signal samples on a cycle-to-cycle basis;
sample the nonsinusoidal signal waveform at multiple instants within a given cycle of the nonsinusoidal signal waveform; and
determine whether the load is demanding less power over time based on a comparison of a change in samples representing the nonsinusoidal signal waveform during the given cycle against a threshold.

22. The electronic device of claim 18 wherein the microcontroller is further configured to:
sample the nonsinusoidal signal waveform to collect the output signal samples on a cycle-to-cycle basis;
sample the nonsinusoidal signal waveform at multiple instants within a given cycle; and
determine whether consecutive cycles indicate that the load is demanding more power over time by comparing a change in samples representing the nonsinusoidal signal waveform from cycle-to-cycle against a threshold.

23. The electronic device of claim 18 wherein the at least one parameter includes duty width and the microcontroller is further configured to:
sample the nonsinusoidal signal waveform to collect the output signal samples on a cycle-to-cycle basis;
sample the nonsinusoidal signal waveform at multiple instants within a given cycle; and
re-calculate the duty width using a current cycle's peak output voltage if the current cycle's peak output voltage is less than the previous cycle's peak output voltage and, otherwise, re-calculate the duty width based on an average of the current cycle's peak output voltage and the previous cycle's peak output voltage.

24. The electronic device of claim 18 wherein the at least one parameter includes duty width, the nonsinusoidal waveform is a nonsinusoidal voltage waveform, and further wherein the microcontroller is further configured to:
sample the nonsinusoidal signal waveform to collect output signal samples on a cycle-to-cycle basis;
sample the nonsinusoidal signal waveform at multiple instants within a given cycle; and
calculate a Root Mean Square (RMS) voltage for a present half cycle of a given cycle including all output voltage samples collected in the present half cycle and setting a voltage of the nonsinusoidal voltage waveform to zero if the RMS calculated has reached a nominal output voltage.

25. A method of controlling an output signal to be delivered to a load, the method comprising:
by a microcontroller of an electronic device, generating a nonsinusoidal signal waveform for delivery to the load;
by the microcontroller, sampling the nonsinusoidal signal waveform to collect output signal samples; and
by the microcontroller, adjusting at least one parameter of the nonsinusoidal signal waveform by adjusting the generating responsive to an effect of the load on the nonsinusoidal signal waveform, the effect of the load being due to the load's demand for more or less power and determined from the output signal samples collected, wherein the electronic device is a computer.

26. The method of claim 25 wherein the at least one parameter includes duty width.

27. The method of claim 25 further comprising including an active power factor correction (PFC) controller in the load.

28. The method of claim 25 further comprising, by the microcontroller:
collecting the output signal samples on a cycle-to-cycle basis;
sampling the nonsinusoidal signal waveform at multiple instants within a given cycle of the nonsinusoidal signal waveform; and
determining whether the load is demanding less power over time based on a comparison of a change in samples representing the nonsinusoidal signal waveform during the given cycle against a threshold.

29. The method of claim 25 further comprising, by the microcontroller:
collecting the output signal samples on a cycle-to-cycle basis;
sampling the nonsinusoidal signal waveform at multiple instants within a given cycle of the nonsinusoidal signal waveform; and
determining whether consecutive cycles indicate that the load is demanding more power over time by comparing a change in samples representing the nonsinusoidal signal waveform from cycle-to-cycle against a threshold.

30. The method of claim 25 wherein the at least one parameter includes duty width, the method further comprising, by the microcontroller:
collecting the output signal samples on a cycle-to-cycle basis;
sampling the nonsinusoidal signal waveform at multiple instants within a given cycle of the nonsinusoidal signal waveform; and
re-calculating the duty width using a current cycle's peak output voltage if the current cycle's peak output voltage is less than the previous cycle's peak output voltage and, otherwise, re-calculating the duty width based on an average of the current cycle's peak output voltage and the previous cycle's peak output voltage.

31. The method of claim 25 wherein the at least one parameter includes duty width, the nonsinusoidal waveform is a nonsinusoidal voltage waveform, the method further comprising, by the microcontroller:
collecting the output signal samples on a cycle-to-cycle basis;
sampling the nonsinusoidal signal waveform at multiple instants within a given cycle of the nonsinusoidal signal waveform; and
calculating a Root Mean Square (RMS) voltage for a present half cycle of a given cycle including all output voltage samples collected in the present half cycle and setting a voltage of the nonsinusoidal voltage waveform to zero if the RMS calculated has reached a nominal output voltage.

32. The method of claim 25 further comprising:
adjusting the at least one parameter, in compensation for the load's demanding more or less power, to control the nonsinusoidal signal waveform in order to deliver a desired signal characteristic to the load, wherein the desired signal characteristic is a desired root mean square (RMS) signal level.

33. The method of claim 25, wherein the at least one parameter includes duty width, the method further comprising, by the microcontroller:

collecting the output signal samples on a cycle-to-cycle basis; and sampling the nonsinusoidal signal waveform at multiple instants within a given cycle of the nonsinusoidal signal waveform, wherein, in a case of falling output signal samples, adjusting the at least one parameter includes increasing the duty width, and further wherein, in a case of rising output voltage samples, adjusting the at least one parameter includes decreasing the duty width, and optionally wherein decreasing the duty width matches the RMS signal level of output voltage samples to the desired RMS signal level.

34. The method of claim 25, further comprising, by the microcontroller:

sampling the nonsinusoidal signal waveform on a cycle-to-cycle basis; and determining whether the load is demanding more power over time based on consecutive cycles, wherein adjusting the at least one parameter includes increasing a duty width of the nonsinusoidal signal waveform to compensate for the load's demanding more power.

* * * * *